(12) United States Patent
Malloy et al.

(10) Patent No.: US 12,061,628 B1
(45) Date of Patent: Aug. 13, 2024

(54) COMPUTING A DIGITAL EXPERIENCE INDEX

(71) Applicant: Riverbed Technology, Inc., San Francisco, CA (US)

(72) Inventors: Patrick J. Malloy, Queensbury, NY (US); Aaron R. Coble, Albany, NY (US); Denis J. C. Ducasse, Balerno (GB); Mark E. C. Robinson, Watlington (GB); Nicole Andree M. Shoblom, Bentonville, AR (US)

(73) Assignee: Riverbed Technology, LLC, San Francisco, CA (US)

( * ) Notice: Subject to any disclaimer, the term of this patent is extended or adjusted under 35 U.S.C. 154(b) by 78 days.

(21) Appl. No.: 17/749,948

(22) Filed: May 20, 2022

Related U.S. Application Data

(60) Provisional application No. 63/191,800, filed on May 21, 2021.

(51) Int. Cl.
*G06F 16/00* (2019.01)
*G06F 11/34* (2006.01)
*G06F 16/28* (2019.01)

(52) U.S. Cl.
CPC ........ *G06F 16/285* (2019.01); *G06F 11/3495* (2013.01)

(58) Field of Classification Search
CPC ........................... G06F 16/285; G06F 11/3495
USPC ........................................................ 707/740
See application file for complete search history.

(56) References Cited

U.S. PATENT DOCUMENTS

| | | | | |
|---|---|---|---|---|
| 9,516,053 B1* | 12/2016 | Muddu | ................. | G06F 3/0484 707/707 |
| 2012/0278263 A1* | 11/2012 | Borthwick | ............. | G06N 20/00 706/12 |
| 2014/0236953 A1* | 8/2014 | Rapaport | ............... | G06F 16/285 707/740 |
| 2019/0361937 A1* | 11/2019 | Rogynskyy | ......... | G06F 11/3495 707/707 |
| 2020/0320191 A1* | 10/2020 | Asai | ...................... | G06F 21/554 707/707 |
| 2022/0124543 A1* | 4/2022 | Orhan | .................... | G06N 3/006 707/707 |

* cited by examiner

*Primary Examiner* — Alexandria Y Bromell
(74) *Attorney, Agent, or Firm* — Park, Vaughan, Fleming & Dowler LLP

(57) ABSTRACT

Measurement data may be collected for a computing system, where the measurement data may correspond to leaf nodes in a tree that organizes the measurement data into a hierarchy of categories. A score associated with a first node in the tree may be calculated based on the measurement data and a set of weights, where each node in the tree may be associated with a weight in the set of weights, and where a score associated with a node in the tree may be based on scores associated with child nodes of the node. A first score corresponding to the computing system may be reported relative to other scores corresponding to other computing systems, where the other scores are computed based on other measurement data collected from other computing systems and the set of weights.

19 Claims, 4 Drawing Sheets

Configuration GUI — 502

| Category | Weight | Goals | | |
|---|---|---|---|---|
| Business Applications | 2 | Impressive | Maintain | |
| Devices | 5 | Top Tier | Excellent | Typical | Improve | Maintain |
| Collaboration Tools | 1 | Top Tier | Excellent | Typical | Improve | Maintain |
| Productivity Tools | 3 | Top Tier | Excellent | Typical | Improve | Maintain |
| Other Applications | 2 | Top Tier | Excellent | Typical | Improve | Maintain |

504 — Category column
506 — Weight
508 — Goals

DXI Components — 510

Collaboration Tools
- Teams
- Zoom

Productivity Tools
- Outlook
- Excel
- PowerPoint
- Word

FIG. 5

COMPUTING A DIGITAL EXPERIENCE INDEX

RELATED APPLICATION

This application claims priority to U.S. Provisional Patent Application No. 63/191,800, filed on 21 May 2021, the contents of which are herein incorporated by reference in their entirety for all purposes.

TECHNICAL FIELD

This disclosure generally relates to computer systems. More specifically, this disclosure relates to computing a digital experience index (DXI).

BACKGROUND

Computer systems are used for performing many mission critical tasks in various industries. The terms "computer system" or "system" may refer to a collection of computers and networks used by an organization. Monitoring the health of computer systems and networks is important to ensure stable and reliable operation of computer systems and networks.

SUMMARY

Embodiments described herein provide systems and techniques to compute and report a DXI. Measurement data may be collected for a computing system, where the measurement data may correspond to leaf nodes in a tree that organizes the measurement data into a hierarchy of categories. A score associated with a first node in the tree may be computed based on the measurement data and a set of weights, where each node in the tree may be associated with a weight in the set of weights, and where a score associated with a node in the tree may be based on scores associated with child nodes of the node. A first score corresponding to the computing system may be reported relative to other scores corresponding to other computing systems, where the other scores may be computed based on other measurement data collected from other computing systems and the set of weights. In some embodiments described herein, scores associated with nodes may be cached and used to recalculate scores associated with higher nodes in the tree when weights associated with the nodes are modified.

In some embodiments described herein, collecting measurement data for a computing system may include normalizing the measurement data based on a population size of devices, users, or both devices and users in the computing system. In some embodiments described herein, the measurement data may be mapped to a score based on comparing the measurement data with a goal.

In some embodiments described herein, computing the score associated with the first node in the tree may include computing a weighted sum of scores associated with child nodes of the first node.

Some embodiments described herein may automatically set goals for nodes in the tree, where each goal may represent a threshold score. A goal may be based on a historical baseline score or a benchmark score. In some embodiments described herein, automatically set goals may include determining a leaf goal corresponding to a set of leaf nodes so that a threshold percentage of leaf nodes in the set of leaf nodes have scores that are worse than the leaf goal.

Some embodiments described herein may modify a measurement datapoint to determine a change in the first score cause by said modifying. Next, an importance of improving the measurement datapoint may be determined based on the change in the first score caused by said modifying.

Some embodiments described herein may detect a trend based on scores computed at different time instances.

BRIEF DESCRIPTION OF THE FIGURES

FIG. 5 illustrates a GUI for configuring parameters for computing a digital experience index in accordance with some embodiments described herein.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Figure 1:
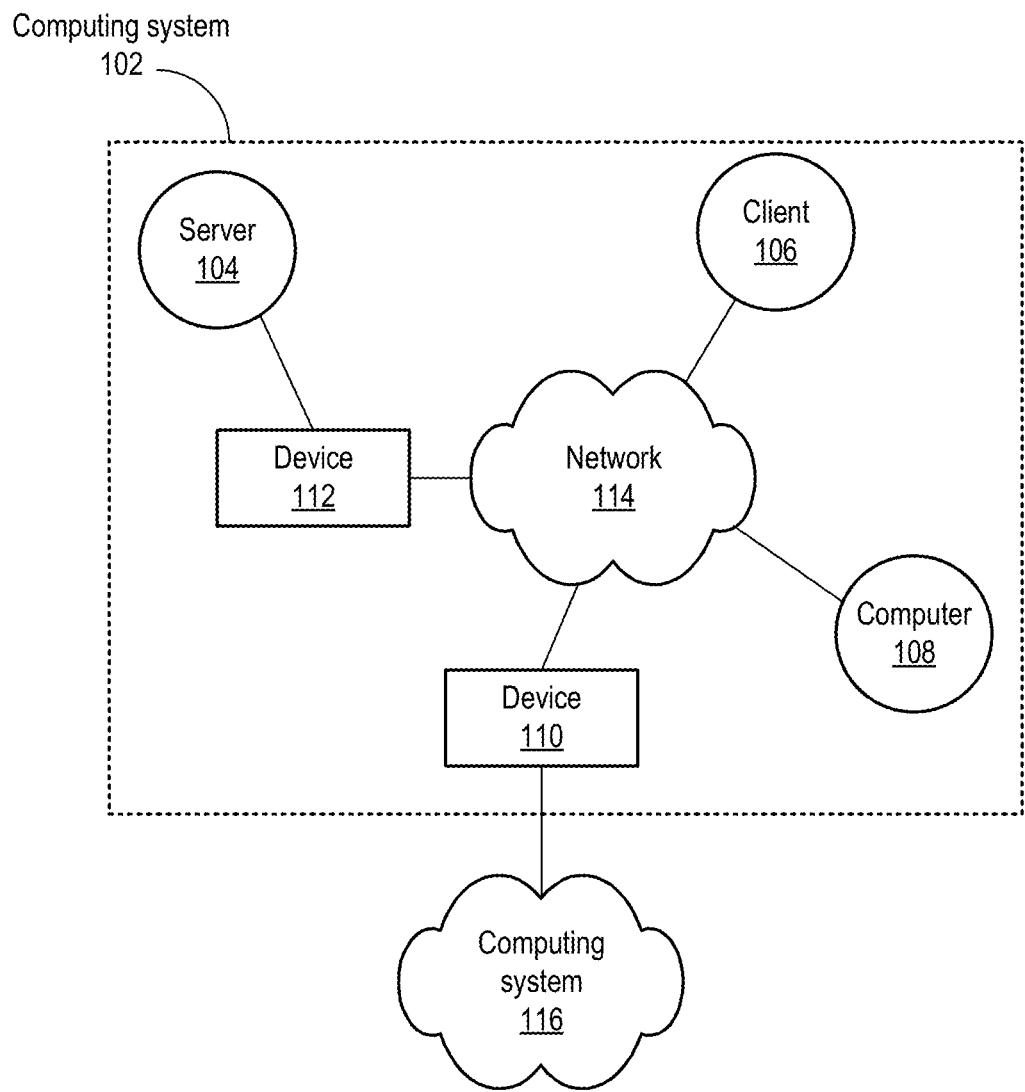
FIG. 1 illustrates a computing system in accordance with some embodiments described herein.

FIG. 1 illustrates a computing system in accordance with some embodiments described herein.

Computing system 102 may include server 104, client 106, computer 108, and devices 110 and 112, which may communicate with one another over network 114. Computing system 102 may be communicatively coupled with other computing systems, e.g., computing system 102 may be communicatively coupled with computing system 116 through device 110. The computing system shown in FIG. 1 is for illustration purposes and is not intended to limit the scope of the disclosure. In general, a computing system may include thousands or millions of devices.

The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers.

The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network is typically accomplished using a layered software architecture, which is often referred to as a networking software stack or a networking stack. A given functionality in a networking stack can be implemented using hardware or software or a combination thereof. The decision to implement a specific functionality in hardware or software is typically based on a tradeoff between performance and cost.

Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

DXI

Numerous objects (which may include, but are not limited to, users, devices, applications, and networks) in a computer system may be monitored and a variety of metrics may be measured for each monitored object. The measured data may be used to determine the health of the computer system.

Some embodiments described herein feature a DXI, which may define a hierarchical system for scoring individual aspects of end-user experience and combining these individual scores to score multiple levels of the hierarchy. Ultimately, the score calculation may provide a single overall score that represents the health and satisfaction of a population of devices and users in a computing system.

In some embodiments described herein, DXI can be modelled as a tree in which the leaf nodes represent concrete measurements such as a count of system crashes or the average response time for a specific application to launch. The root of the tree may represent the overall score for the population and the intermediate nodes may represent categories or groupings of related measurements, which may also be scored.

For example, there can be a group of measurements related to device resource usage such as a central processing unit (CPU) and a random access memory (RAM) and a different category related to the performance of collaboration tools such as video-conferencing and instant-messaging software. The tree does not need to be balanced; different branches may have varying depths. An example of a tree that defines a hierarchical scoring calculation is shown below:

```
Overall score
  Business applications
    HR applications
      Hiring application
        Activity response-time
        Application wait-time
        Application hang-time
        Application crashes
      Benefits software
        . . .
    Finance applications
      . . .
  Devices
    Boot Time
    Logon Time
    System Crashes
    CPU Usage
    RAM Usage
    . . .
  Collaboration tools
    Video-conferencing applications
      Crashes
      Launch time
      . . .
    Instant-messaging applications
      . . .
  Productivity tools
    Word processing applications
      Crashes
      Save document response-time
      . . .
    Spreadsheet applications
      . . .
  Other Applications
    Web browsers
      Web page errors
      Page load time
      . . .
```

To support the benchmarking capabilities described below, it is important that the measurements defining the leaf-nodes are normalized to account for the size of the organization in terms of the number of devices and users. In the case of average values, such as the average response-time for a particular activity, no normalization may be needed; for counts of events, such as system crashes, those measurements are defined as a rate of events relative to the amount of usage time (summed across users/devices).

Scoring and Goals

The score for each individual measurement that contributes to the overall score may be based on a defined performance goal. This goal represents either a current level of performance that is desired to be maintained or, if current performance needs to be improved, it can be a future level of performance that is targeted. The goal defines an acceptable level of performance for that measurement. For example, in some embodiments described herein, if the measurement meets or exceeds the goal, then it may be assigned a perfect score of 100. If the measurement is more than three times worse than the goal, then it may be assigned the worst score of 0. Any measurement falling between the goal and three times the goal may be scored using a linear interpolation between 100 and 0. An example embodiment for computing the score for a single measurement is shown below in pseudo-code:

```
function compute_measurement_score (value, goal) {
    if value<=goal {
        return 100.0
    } else if value>3.0*goal {
        return 0.0
    } else {
```

```
        width=(3.0*goal)-goal
        delta=value-goal
        distance=delta/width
        return (1.0-distance)*100.0
    }
  }
}
```

For example, if the goal for the launch time of a word-processing application is set to 2 seconds, then the following scores could result:

| Measurement | Score |
|---|---|
| 1 second | 100 |
| 2 seconds | 100 |
| 3 seconds | 75 |
| 4 seconds | 50 |
| 5 seconds | 25 |
| 6 seconds | 0 |
| 7 seconds | 0 |

The score for a group of measurements may be computed as a weighted average of the scores for the individual measurements. Each individual measurement may be assigned a relative importance, which may be used as its weight when computing the average.

For example, a system crash might be considered very important and be given a weight of 5 whereas a printing error might be considered low importance and receive a weight of 1. Where there are multiple levels of hierarchy, the sub-categories may also be assigned a relative importance and the score for a higher-level category may be computed as a weighted average of the scores for its sub-categories. Finally, the top-level categories may each be assigned a relative importance and the overall score may be computed as a weighted average of the scores for these top-level categories. For example, the health of a fleet of devices might be considered of the highest importance and be weighted 5, whereas collaboration tools might be considered slightly less important and receive a relative weight of 3.

As an example, consider the following set of categories with their respective importance and scores:

| Category | Importance | Score |
|---|---|---|
| Business applications | 2 | 72 |
| Devices | 5 | 85 |
| Collaboration tools | 3 | 91 |
| Productivity tools | 1 | 89 |
| Other applications | 1 | 56 |

The sum of the weights is equal to sum_weights=2+5+3+1+1. And the overall score may be computed as the weighted sum as follows: overall_score=(2*72+5*85+3*91+1*89+1*56)/sum_weights.

Automated Goal Setting

Choosing appropriate goals for the individual measurements and appropriate weights for the measurements and sub-categories may require a significant amount of knowledge and effort. To reduce this effort, default weights for the individual measurements and the categories may be provided. Additionally, multiple calculation processes and techniques may be provided to automate the selection of goals. The default weights may be selected based on domain-knowledge of the severity of different types of events and by surveying the typical values selected by users. The automated goal selection may be based on historical baselines or comparison to industry benchmarks. The assignment of goals may be performed at various levels in the category hierarchy. The same choice of goal could be applied uniformly across all the top-level categories, different goals could be applied uniformly within each of the categories, or leaf nodes could be assigned different goals individually based on some pattern.

If historical baselines are used, the user may decide whether they want to maintain the current performance, by setting the goal to the historical baseline, or whether they want to improve upon current performance, by setting the goal to a percentage of the historical baseline. For each of the individual measurements, the baseline may be computed based on the historical performance of that measurement, looking back over an extended timeframe. The goal for each individual measurement may then be set as some percentage of that baseline. For the industry benchmarks, the typical value for each individual measurement may be gathered for a large number of organizations, which may have been labelled with the industry of the organization. The values for each organization may be stored anonymously, segmented by industry. This may results in an anonymized set of values for each measurement for each of the industries and also globally across all industries. A user can choose to set their goals by comparing to the benchmark computed for their industry or based on the global benchmark across all industries. The goal for each individual measurement may be set to some percentile of the set of values in the benchmark for that measurement; for example, the $50^{th}$ percentile could be used to achieve typical performance for that industry, whereas $90^{th}$ percentile could be selected to achieve exceptional performance compared to the benchmark.

The same automated goal-setting process or technique may not need to be applied consistently across the entire model. For example, one could target maintaining current performance for devices, by setting the goals in that category to match the historical baseline but set the goals for the collaboration tools category using the $90^{th}$ percentile of the industry benchmark. This allows flexibility to focus on specific areas and degrees of improvement among the categories.

Before the user begins setting their goals and configuring relative importance, an initial set of goals may be automatically selected for the user. These embodiments may choose which of the goal options should be used; this choice is made from the set of options the user could manually select that were described above. The benefit of choosing from the set of user-configurable options is that it is easily understandable by users, compared with an arbitrary selection of goals. The objective of the embodiment may be to achieve a balance such that the goals are neither overly stringent nor overly lenient and the user sees areas where they are performing well and those requiring improvement. It is difficult for a user to focus and identify the key areas of importance if they are initially presented either with a view where everything appears to be problematic or everything appears to be satisfactory.

An example of a heuristic approach to implement goal selection may begin by selecting the most lenient goals ($50^{th}$ percentile of the industry benchmark) and then calculate a measure of how badly the leaf nodes are performing with these goals. If the current goals have enough leaf nodes that require improvement, then the current goals may be used. If there aren't enough leaf nodes requiring improvement, then the next harder set of goals may be used ($75^{th}$ percentile of the industry benchmark) and the process may be repeated. If there are enough leaf nodes that require improvement with the 75$^{th}$ percentile goals being used, then we will use those goals; otherwise, the 90$^{th}$ percentile goals will be selected. A pseudo-code implementation of this process is shown below:

```
function compute_badness_of_leaves(leaves, percentile_goals) {
    badness = 0
    for leaf in leaves {
        // compute the dxi score for this leaf
        leaf_dxi = compute_measurement_score(leaf.value,
        percentile_goals[leaf])
        if leaf_dxi < 50 {
            // leaves scoring less than 50 increase badness by 3
            badness = badness + 3
        } else if leaf_dxi < 80 {
            // leaves scoring less than 80 increase badness by 1
            badness = badness + 1
        }
        // leaves with scores above 80 don't impact badness
    return badness
}
function auto_select_initial_goals(leaves, percentile_goals_map) {
    goal_selection = percentile_goals_map[50]
    badness = compute_badness_of_leaves(leaves, goal_selection)
    if badness > badness_threshold {
        // enough leaves need improvement. Use 50$^{th}$ percentile goals
        return goal_selection
    }
    goal_selection = percentile_goals_map[75]
    badness = compute_badness_of_leaves(leaves, goal_selection)
    if badness > badness_threshold {
        // enough leaves need improvement. Use 75$^{th}$ percentile goals
        return goal_selection
    }
    // use 90$^{th}$ percentile for goals
    return percentile_goals_map[90]
}
```

Many variations for how the initial goal-selection could be implemented will be apparent to a skilled practitioner. For example, one modification to the approach described above would be to make independent selections of the goals for each of the top-level categories, or make independent selections for the goals for each individual leaf node.

In other embodiments, goal selection may be implemented using machine learning. For example, one could use machine learning on a body of examples (representing the hierarchy of scores) that have been labelled as "balanced" or "unbalanced" in order to train a classifier to identify balanced score hierarchies; this model could be used to identify how balanced the scores are when tuning the selection of goals. Some solutions from the machine-learning space could be implemented using logistic regression. Yet another approach could define a target overall score and a target level of variance for the scores of the leaf nodes and then treat this as an optimization problem; random walks and hill-climbing are examples of techniques that could be used for an optimization-based approach.

Comparison to Industry Benchmarks

In addition to their role in goal setting, the industry benchmarks may be used to highlight the performance of an organization relative to its peers. This comparison may be done both at the level of individual measurements and at the level of the categories in the model.

At the level of the individual measurements, the organization's value for a measurement may be plotted along with the set of values for that measurement from the benchmark. This plot may be augmented with information such as the median, 25$^{th}$ percentile, and 75$^{th}$ percentile of the benchmark values to illustrate the relative performance of the organization for that measurement as well as the distribution of values within the industry. The percentile may also be computed for the organization's value (relative to the benchmark distribution) as an indication of relative performance. Ranking the individual measurements based on their percentile (relative to the benchmarks) may identify where the organization's performance is best and worst relative to its peers.

For benchmark comparison at the level of categories within the model, category-level scores may be gathered across many organizations in order to form the set of values for the benchmark. However, this would only capture how well each organization is performing relative to its own goals and would not allow for direct comparison of absolute performance. Instead of doing that, in some embodiments described herein, the goals and weights that the user has set may be applied to each organization in the benchmark to compute its full hierarchy of scores. This captures how each organization in the benchmark would score, assuming they selected to use the same goals and weights as the user. By using a common selection of goals and weights, some embodiments can provide a fair comparison of absolute performance across the organizations, while remaining relevant to the user's specific objectives.

As with comparison of the individual measurements, the organization's score for a particular top-level category may be plotted beside the scores from the benchmark and augment the plot with the benchmark score quartiles to highlight the organization's relative performance and the distribution of scores within the industry. Again, the percentile for the organization's score for each top-level category may be computed relative to the benchmark scores and the categories are ranked by percentile to identify those categories where the organization is performing best and worst relative to its peers.

The following pseudo-code illustrates a function to calculate the score for a given item in the hierarchy. In the following pseudo-code, "item" is a node in the tree that can be a leaf node or a category. The arguments "user_goals" and "user_weights" may be the goals and weights, respectively, that have been set by the user.

```
function compute_score_for_item (item, users_goals, users_weights) {
    if is_leaf_node(item) {
        return compute_measurement_score(item.value, users_goals[item])
    } else {
        sum_child_weighted_scores = 0
        sum_child_weights = 0
        for child in item.children {
            child_score =
compute_score_for_item(child,user_goals,user_weights)
            sum_child_weighted_score += (child_score * user_weights[child])
            sum_child_weights += user_weights[child]
        }
        return sum_child_weighted_scores / sum_child_weights
    }
}
// map from category name to the list of benchmark scores
category_to_benchmarks_scores_map = { }
// iterate over each of the organizations appearing in benchmark
for organization in benchmark_orgs {
    // iterate over each top-level category
    for top_level_category in organization.children {
        score =
compute_score_for_item(top_level_category,user_goals,user_weights)
        category_to_benchmarks_scores_map[top_level_category]. append(score)
    }
}
// note that we are using the same user_goals and user_weights
// for all the organizations in the benchmark
```

```
// these are the goals and weights set by the user
// now we can compute the percentiles for the top-level
categories for the user
user_percentiles_for_categories = [ ]
for top_level_category in users_data.children {
   user_score =
compute_score_for_item(top_level_category,user_goals,user_weights)
   benchmark_scores =
category_to_benchmarks_scores_map[top_level_category]
   category_percentile =
compute_percentile(user_score,benchmark_scores)
   x = {category: top_level_category, percentile: category_percentile}
   user_percentiles_for_categories.append(x)
}
// sort by percentile
user_percentiles_for_categories.sort_by("percentile")
```

Identifying Opportunities for Improvement

Once the performance of the organization is understood, steps can be taken to improve areas of poor performance. Before undertaking such efforts, it is valuable to know which improvements will have the greatest impact on overall performance so that the greatest benefit can be achieved for a given investment. For each of the individual measurements in the model, we compute what the overall score would have been if the value for that measurement had not been its current value but had instead met the goal. This is done by substituting the goal value for the current value for that single measurement and then proceeding to compute the overall score as normal; the computation may be performed for each measurement separately, changing only a single measurement at a time while using the current value for all the other measurements. The measurement resulting in the greatest change in overall score constitutes the greatest opportunity for improvement. The following pseudo-code illustrates a function to replace the value for a single item in the hierarchy.

```
function replace_item_value(item, to_replace, value_to_use) {
   if item == to_replace {
      item.value = value_to_use
      return
   }
   for child in item.children {
replace_item_value(child,to_replace,value_to_use)
   }
}
// compute the actual current overall score
current_overall_score =
compute_score_for_item(users_data,user_goals,user_weights)
// get the list of leaf nodes
leaf_nodes = get_all_leaf_nodes(users_data)
leaf_improvements = [ ]
// iterate over all the leaf nodes
for leaf_node in leaf_nodes {
   // create a fresh copy of the hierarchy
   copy_of_data = users_data.copy( )
   // set the value of just this leaf node to the goal
value for that measurement
   goal_value = user_goals[leaf_node]
   value_change = leaf_node.value − goal_value
replace_item_value(copy_of_data,leaf_node,goal_value)
   // compute the score with the updated value for this one measurement
   score_if_goal_met =
compute_score_for_item(copy_of_data,user_goals,user_weights)
   improvement = score_if_goal_met − current_overall_score
   x = {name: leaf_node, score_improvement: improvement,
   time_saved: value_change}
   leaf_improvements.append(x)
}
// sort to get the measurements that have the greatest
impact on overall score
leaf_improvements.sort_by("score_improvement")
```

It is also valuable to understand the business impact of each of these opportunities for improvement, since this savings can justify the work required to improve that measurement. The business impact for time-based measurements is computed directly as a time savings. For example, if the average Boot Time for a device is currently two minutes and the goal for Boot Time is one minute, then meeting the goal will result in a savings of one minute per boot event. This savings per boot event is multiplied by the total number of boot events per year (across the entire fleet of devices) in order to compute the organization's time savings per annum resulting from meeting the Boot Time goal.

The time savings per annum can also be represented as a savings of full-time employees, which is normalized so that it is not based on a specific time period (per year, per month, etc.). If the organization is interested in the financial impact of this savings, the time savings per annum can be translated into a financial savings based on the average employee salary or hourly wage.

It is worth noting that the measurement with the greatest impact on the overall score may not be the same as the measurement with the greatest business impact, depending on the relative weights and the volume of usage or frequency with which different events occur. A small improvement to a measurement that results in only a modest improvement to the overall score could result in a large business impact if it is something that occurs very frequently. For those measurements, such as crash event counts, that are not inherently time-based, we calculate or estimate the amount of time lost whenever such an event occurs; after that translation, the business impact calculations for such measurements are the same.

Trend Detection

Once an embodiment is configured and running, it may automatically detect both positive and negative trends in the score for each of the individual measurements. The positive trends may be useful to validate that an organization's efforts to remediate an area of poor performance have resulted in the desired improvements. The negative trends can alert an organization to a newly occurring problem in an area that previously had satisfactory performance.

Since users are interested in both long-term and short-term trends in performance, an ensemble method may be used to identify trending on various timescales. Some embodiments described herein may use statistical techniques for implementing the trend detection on varying timescales to feed into the ensemble.

For example, a linear-regression model may be fitted to the points for the entire period of the historical baseline in order to identify long-term trends. To identify short-term trends, a linear-regression model may be fitted to only the most recent datapoints. A step-change where there is a flat trend for recent points and a flat trend for older points, but at different levels, could be handled by computing the mean value for recent datapoints as well as the mean value for datapoints further in the past; a linear-regression model is then fitted to these aggregated datapoints. Only statistically significant trends, based on the amount of change and goodness of fit of the model, may be presented to the user.

Outlier detection may also be used to eliminate results where the current value for the measurement is considered anomalous. Multiple strategies may be used for selecting the output based on each of the components of the ensemble. For example, a restrictive strategy would require all the inputs to identify a significant trend and agree upon the direction. On the other hand, a relaxed strategy would require that only one of the inputs identify a significant trend, and that there were no disagreements in the case of multiple trends. Other strategies may be used for resolving disagreements in trends or requiring that more than one but less than all of the inputs identify a trend.

Performance

The results shown to users may represent trillions of individual data points, which presents a performance and scalability challenge. A significant amount of data may need to be retrieved in order to have the current performance across all the measurements, as well as the historical baseline for each measurement. Furthermore, assembling the benchmarks requires gathering even more data from many organizations across multiple systems. In order to maintain responsiveness from the end-user's perspective, the lower-level data (e.g., hourly CPU usage per device across many devices) is transformed into summary data (e.g., weekly CPU for a single customer environment) and persisted in a batch mode (e.g., weekly or nightly) or pulled on demand and cached if not already handled by batch mode. Scoring computations (based on the user's current configuration) are then performed on-demand using the input of that persisted and summarized lower-level data. This means that a change to the configuration, such as adjusting the goals or changing the relative importance, can be displayed to the user quickly, because the cached data is already present, and we only need to repeat the computations using the new configuration. This approach of caching the values but computing the scores live also enables our method for benchmark comparison, in which the actual scores for each industry peer can be recomputed very quickly based on the user's current configuration, using the cached values for the benchmark dataset. Since the industry benchmarks are the most expensive to gather and overall are the slowest to exhibit change, these values are cached the longest and updated the least frequently. The individual measurements for the organization may need to be updated more frequently in order to reflect the current performance based on recent time periods; we cannot cache these values as long or the end-user would observe a delay before recent time periods are represented.

Process for Computing a DXI

Figure 2:
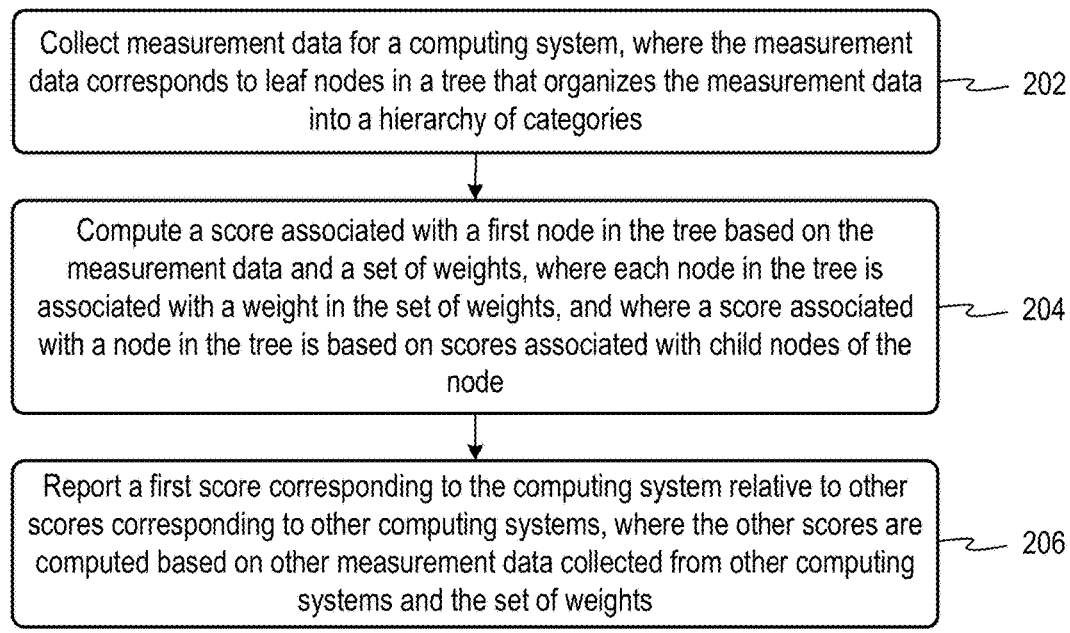
FIG. 2 illustrates a process for computing a DXI in accordance with some embodiments described herein.

FIG. 2 illustrates a process for computing a DXI in accordance with some embodiments described herein.

Measurement data may be collected for a computing system, where the measurement data corresponds to leaf nodes in a tree that organizes the measurement data into a hierarchy of categories (at 202). Specifically, in some embodiments described herein, the measurement data may be normalized based on a population size of devices, users, or both devices and users in the computing system. In some embodiments described herein, the measurement data may be mapped to a score based on comparing the measurement data with a goal. For example, see the section titled "DXI" in this disclosure.

A score associated with a first node in the tree may be computed based on the measurement data and a set of weights, wherein each node in the tree is associated with a weight in the set of weights, and wherein a score associated with a node in the tree is based on scores associated with child nodes of the node (at 204). In some embodiments described herein, computing the score associated with the first node in the tree may include computing a weighted sum of scores associated with child nodes of the first node. For example, see the section titled "DXI" in this disclosure.

A first score corresponding to the computing system may be reported relative to other scores corresponding to other computing systems, wherein the other scores are computed based on other measurement data collected from other computing systems and the set of weights (at 206). For example, see the section titled "Comparison to industry benchmarks" in this disclosure.

In some embodiments described herein, the process may automatically set goals for nodes in the tree, where each goal represents a threshold score. In some embodiments, at least one goal may be based on a historical baseline score. In some embodiments, at least one goal may be based on a benchmark score. In some embodiments, automatically setting goals for nodes in the tree may include determining a leaf goal corresponding to a set of leaf nodes so that a threshold percentage of leaf nodes in the set of leaf nodes have scores that are worse than the leaf goal. For example, see the section titled "Automated goal setting" in this disclosure.

In some embodiments described herein, a measurement datapoint may be modified to determine a change in the first score cause by said modifying. Next, an importance of improving the measurement datapoint may be determined based on the change in the first score caused by said modifying. For example, see the section titled "Identifying opportunities for improvement" in this disclosure.

In some embodiments described herein, a trend may be detected based on scores computed at different time instances. Next, the tread may be reported to a user. For example, see the section titled "Trend detection" in this disclosure.

In some embodiments described herein, scores associated with nodes may be cached and used to recalculate scores associated with higher nodes in the tree when weights associated with the nodes (which are at a lower level than the higher nodes) are modified. With respect to a node in the tree, higher nodes are closer to the root node of the tree, and lower nodes are closer to the leaf nodes of the tree. For example, see the section titled "Performance" in this disclosure.

Apparatus and GUI

Figure 3:
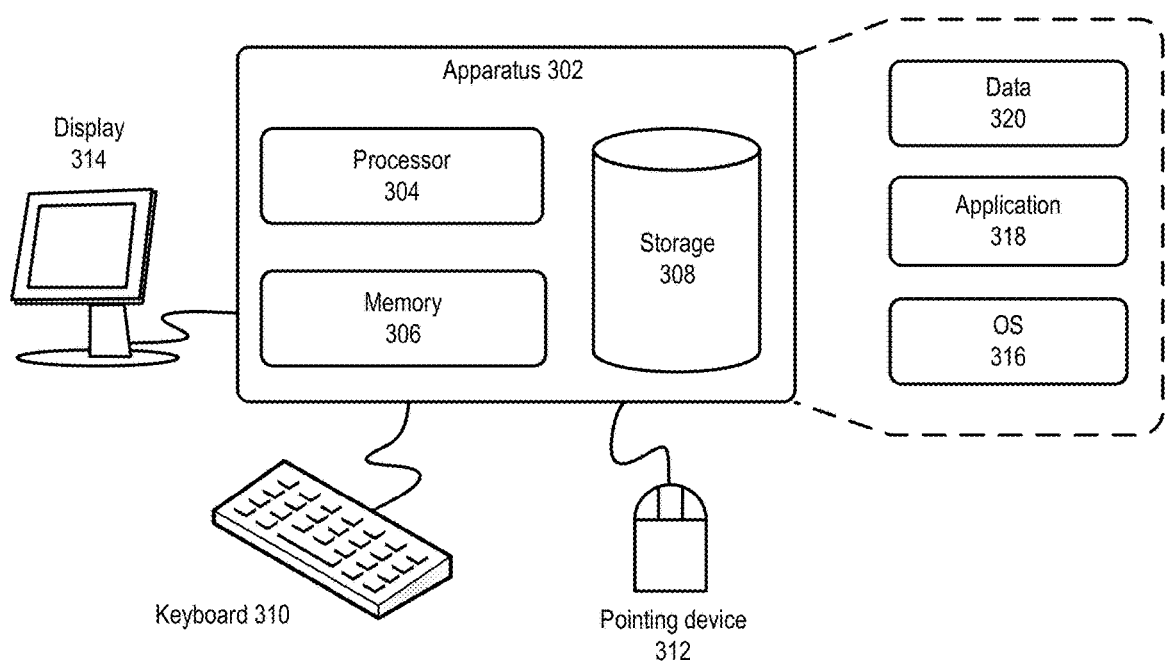
FIG. 3 illustrates an apparatus in accordance with some embodiments described in this disclosure.

FIG. 3 illustrates an apparatus in accordance with some embodiments described in this disclosure.

Apparatus 302 (e.g., a device, a file server, etc.) can include processor 304, memory 306, and storage device 308. Apparatus 302 can be coupled to display device 314, keyboard 310, and pointing device 312. Storage device 308 can store operating system 316, application 318, and data 320. Data 320 can include input required by application 318 and/or output generated by application 318. Apparatus 302 may automatically (or based on user input) perform one or more operations that are implicitly or explicitly described in this disclosure. For example, apparatus 302 can load application 318 into memory 306, and application 318 can then be used to perform a process implicitly or explicitly described in this disclosure and report results using a GUI that is displayed on display device 314.

Figure 4:
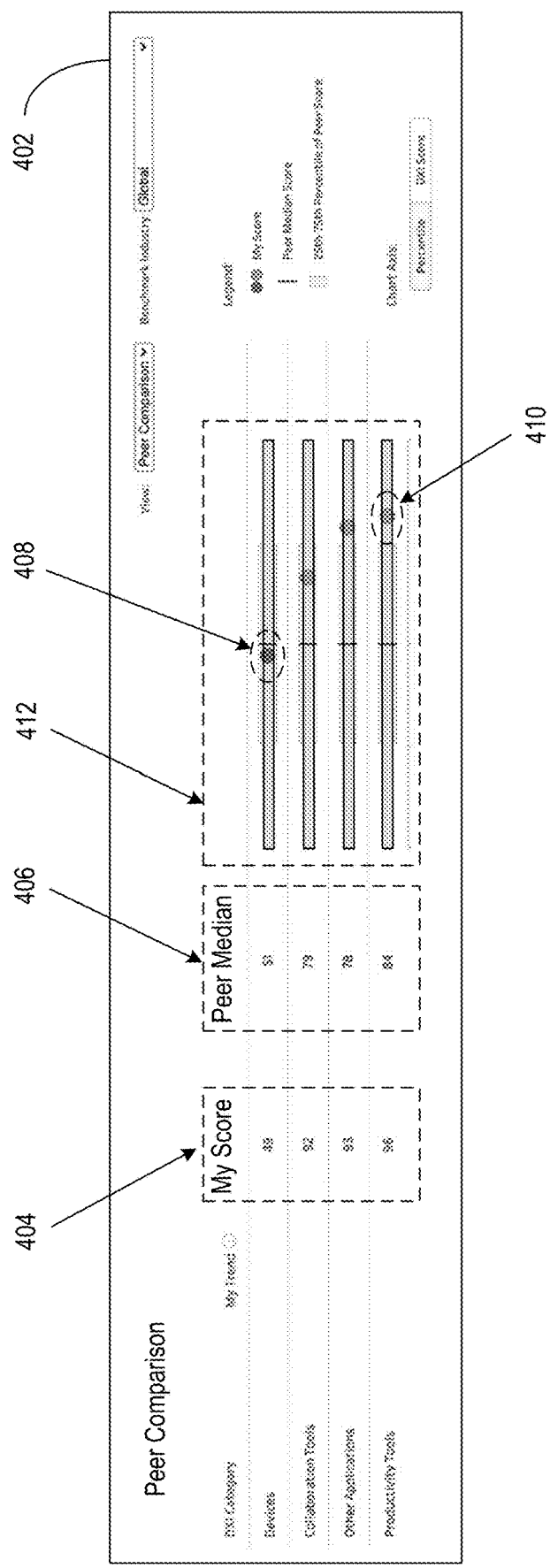
FIG. 4 illustrates a graphical user interface (GUI) to report peer comparison in accordance with some embodiments described herein.

FIG. 4 illustrates a GUI to report peer comparison in accordance with some embodiments described herein. GUI 402 may include region 404 to report the score of a computer system, region 406 to report scores of other computer systems (e.g., a median score of a population of other computer systems), and region 412 to visually compare the score of the computer system with scores of other computer systems. For example, region 412 may include a bar that shows the low, high, and median scores (and may also show the 25$^{th}$ percentile and 75$^{th}$ percentile scores) for each category in a set of categories. Additionally, region 412 may show the score of the computer system with respect to the other scores. For example, indicator 408 may display that the score for the computer system is worse than the median score, whereas indicator 410 may display that the score for the computer system is better than the median score. The indicators may be color coded to further highlight the performance of a compute system with respect to the peer group. For example, indicator 408 may be red, while indicator 410 may be green.

FIG. 5 illustrates a GUI for configuring parameters for computing a digital experience index in accordance with some embodiments described herein. GUI 502 may enable a user to view the weights and goals and configure them as desired. Specifically, GUI 502 may include category region 504, importance region 506, goals region 508, and DXI components region 510. Category region 504 may specify the different categories for which measurement data is being collected and scores are being computed. Importance region 506 may enable a user to view the weights assigned to the categories and modify the weights as desired. Goals region 508 may enable a user to view the goals for each category (which may have been automatically selected) and modify the goals as desired. DXI components 510 may enable a user to view the different components within a category for which measurements are collected and enable the user to select the specific subset of components that are desired to be used for computing the score. In some embodiments described herein, DXI components region 510 may display the tree that represents the hierarchical scoring system.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   collecting measurement data for a computing system, wherein the measurement data corresponds to leaf nodes in a tree that organizes the measurement data into a hierarchy of categories;
   computing, by a processor, a score associated with a first node in the tree based on the measurement data and a set of weights, wherein each node in the tree is associated with a weight in the set of weights, and wherein a score associated with a node in the tree is based on scores associated with child nodes of the node;
   reporting a first score corresponding to the computing system relative to other scores corresponding to other computing systems, wherein the other scores are computed based on other measurement data collected from other computing systems and the set of weights;
   modifying a measurement datapoint to determine a change in the first score cause by said modifying; and
   determining an importance of improving the measurement datapoint based on the change in the first score caused by said modifying.

2. The method of claim 1, wherein said collecting measurement data for a computing system comprises normalizing the measurement data based on a population size of devices, users, or both devices and users in the computing system.

3. The method of claim 2, further comprising mapping the measurement data to a score based on comparing the measurement data with a goal.

4. The method of claim 1, wherein said computing the score associated with the first node in the tree comprises computing a weighted sum of scores associated with child nodes of the first node.

5. The method of claim 1, further comprising automatically setting goals for nodes in the tree, wherein each goal represents a threshold score.

6. The method of claim 5, wherein at least one goal is based on a historical baseline score.

7. The method of claim 5, wherein at least one goal is based on a benchmark score.

8. The method of claim 5, wherein said automatically setting goals for nodes in the tree comprises determining a leaf goal corresponding to a set of leaf nodes so that a threshold percentage of leaf nodes in the set of leaf nodes have scores that are worse than the leaf goal.

9. The method of claim 1, further comprising detecting a trend based on scores computed at different time instances.

10. The method of claim 1, wherein scores associated with nodes are cached and used to recalculate scores associated with higher nodes in the tree when weights associated with the nodes are modified.

11. A non-transitory computer-readable storage medium storing instructions that, when executed by a processor, cause the processor to:

collect measurement data for a computing system, wherein the measurement data corresponds to leaf nodes in a tree that organizes the measurement data into a hierarchy of categories;

compute a score associated with a first node in the tree based on the measurement data and a set of weights, wherein each node in the tree is associated with a weight in the set of weights, wherein a score associated with a node in the tree is based on scores associated with child nodes of the node, and wherein scores associated with nodes are cached and used to recalculate scores associated with higher nodes in the tree when weights associated with the nodes are modified;

report a first score corresponding to the computing system relative to other scores corresponding to other computing systems, wherein the other scores are computed based on other measurement data collected from other computing systems and the set of weights;

modifying a measurement datapoint to determine a change in the first score cause by said modifying; and determining an importance of improving the measurement datapoint based on the change in the first score caused by said modifying.

12. The non-transitory computer-readable storage medium of claim 11, wherein said collecting measurement data for a computing system comprises normalizing the measurement data based on a population size of devices, users, or both devices and users in the computing system.

13. The non-transitory computer-readable storage medium of claim 12, further storing instructions that, when executed by a processor, cause the processor to map the measurement data to a score based on comparing the measurement data with a goal.

14. The non-transitory computer-readable storage medium of claim 11, wherein said computing the score associated with the first node in the tree comprises computing a weighted sum of scores associated with child nodes of the first node.

15. The non-transitory computer-readable storage medium of claim 11, further storing instructions that, when executed by a processor, cause the processor to automatically set goals for nodes in the tree, wherein each goal represents a threshold score.

16. The non-transitory computer-readable storage medium of claim 15, wherein at least one goal is based on a historical baseline score.

17. The non-transitory computer-readable storage medium of claim 15, wherein at least one goal is based on a benchmark score.

18. The non-transitory computer-readable storage medium of claim 15, wherein said automatically setting goals for nodes in the tree comprises determining a leaf goal corresponding to a set of leaf nodes so that a threshold percentage of leaf nodes in the set of leaf nodes have scores that are worse than the leaf goal.

19. An apparatus, comprising:

a memory storing instructions; and a processor, coupled to the memory and to execute the instructions, the instructions when executed cause the processor to:

collect measurement data for a computing system, wherein the measurement data corresponds to leaf nodes in a tree that organizes the measurement data into a hierarchy of categories;

compute a score associated with a first node in the tree based on the measurement data and a set of weights, wherein each node in the tree is associated with a weight in the set of weights, and wherein a score associated with a node in the tree is based on scores associated with child nodes of the node;

set goals for nodes in the tree, wherein each goal represents a threshold score, wherein said setting goals for nodes in the tree comprises determining a leaf goal corresponding to a set of leaf nodes so that a threshold percentage of leaf nodes in the set of leaf nodes have scores that are worse than the leaf goal;

report a first score corresponding to the computing system relative to other scores corresponding to other computing systems, wherein the other scores are computed based on other measurement data collected from other computing systems and the set of weights;

modifying a measurement datapoint to determine a change in the first score cause by said modifying; and determining an importance of improving the measurement datapoint based on the change in the first score caused by said modifying.

* * * * *